United States Patent
Juan et al.

(10) Patent No.: US 9,727,927 B2
(45) Date of Patent: *Aug. 8, 2017

(54) PREDICTION OF USER RESPONSE TO INVITATIONS IN A SOCIAL NETWORKING SYSTEM BASED ON KEYWORDS IN THE USER'S PROFILE

(71) Applicant: Facebook, Inc., Menlo Park, CA (US)

(72) Inventors: Yun-Fang Juan, San Jose, CA (US); Kang-Xing Jin, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/263,224

(22) Filed: Sep. 12, 2016

(65) Prior Publication Data

US 2016/0379316 A1 Dec. 29, 2016

Related U.S. Application Data (63) Continuation of application No. 13/428,765, filed on Mar. 23, 2012, now Pat. No. 9,444,907, which is a continuation of application No. 13/214,211, filed on Aug. 21, 2011, now Pat. No. 8,145,584, which is a continuation of application No. 11/893,820, filed on Aug. 16, 2007, now Pat. No. 8,027,943.

(51) Int. Cl.
  *G06Q 50/00* (2012.01)
  *G06Q 10/10* (2012.01)
  *H04L 29/08* (2006.01)
  *G06Q 30/02* (2012.01)

(52) U.S. Cl.
  CPC ............ *G06Q 50/01* (2013.01); *G06Q 10/10* (2013.01); *G06Q 30/0201* (2013.01); *G06Q 30/0269* (2013.01); *H04L 67/306* (2013.01)

(58) Field of Classification Search
  CPC ....................................................... G06F 17/30
  See application file for complete search history.

(56) References Cited

U.S. PATENT DOCUMENTS 5,937,413 A 8/1999 Hyun et al.
6,029,141 A 2/2000 Bezos et al.
(Continued)

FOREIGN PATENT DOCUMENTS

WO WO 2007/070676 A2 6/2007

OTHER PUBLICATIONS

Chipin. Chipin: The easy way to collect money [online], Dec. 15, 2006 http://web.archive.org/web/20061215090739/www.chipin.com/overview.
(Continued)

*Primary Examiner* — Stanley K Hill
*Assistant Examiner* — Ola Olude Afolabi
(74) *Attorney, Agent, or Firm* — Fenwick & West LLP (57) ABSTRACT

A social networking system selects a subset of keywords from a set of master keywords found in user profiles. The method includes selecting a first and second group of user profiles including one or more keywords and computing the number of occurrences of each of the master keywords in the first and second group of profiles. A value may be computed for each of the master keywords based on a comparison of the number of occurrences in the first group of profiles and the number of occurrences in the second group of profiles. The computed value may be used for selecting the subset of keywords from the master keywords and/or ranking the master keywords.

20 Claims, 3 Drawing Sheets

(56) References Cited

U.S. PATENT DOCUMENTS

| | | |
|---|---|---|
| 6,963,900 B2 | 11/2005 | Boyd |
| 7,013,292 B1 | 3/2006 | Hsu et al. |
| 7,069,308 B2 | 6/2006 | Abrams |
| 7,249,123 B2 | 7/2007 | Elder et al. |
| 7,269,590 B2 | 9/2007 | Hull et al. |
| 7,519,200 B2 | 4/2009 | Gokturk et al. |
| 7,539,697 B1 | 5/2009 | Akella et al. |
| 7,606,168 B2 | 10/2009 | Robinson et al. |
| 7,613,769 B1 | 11/2009 | Hess |
| 7,797,345 B1 | 9/2010 | Martino et al. |
| 7,856,449 B1 | 12/2010 | Martino et al. |
| 7,860,889 B1 | 12/2010 | Martino et al. |
| 8,171,128 B2 | 5/2012 | Zuckerberg et al. |
| 8,832,132 B1 | 9/2014 | Spertus et al. |
| 2001/0037721 A1 | 11/2001 | Hasegawa et al. |
| 2002/0059201 A1 | 5/2002 | Work |
| 2002/0107853 A1 | 8/2002 | Hofmann et al. |
| 2003/0145093 A1 | 7/2003 | Oren et al. |
| 2003/0222918 A1 | 12/2003 | Coulthard |
| 2003/0225632 A1 | 12/2003 | Tong et al. |
| 2004/0006470 A1 | 1/2004 | Kobayashi |
| 2004/0024846 A1 | 2/2004 | Randall et al. |
| 2004/0088177 A1 | 5/2004 | Travis et al. |
| 2004/0122686 A1 | 6/2004 | Hill et al. |
| 2004/0148275 A1 | 7/2004 | Achlioptas |
| 2004/0204973 A1 | 10/2004 | Witting et al. |
| 2005/0021750 A1 | 1/2005 | Abrams |
| 2005/0114130 A1 | 5/2005 | Java et al. |
| 2005/0114759 A1 | 5/2005 | Williams et al. |
| 2005/0120084 A1 | 6/2005 | Hu et al. |
| 2005/0154639 A1 | 7/2005 | Zetmeir |
| 2005/0159970 A1 | 7/2005 | Buyukkokten et al. |
| 2005/0171799 A1 | 8/2005 | Hull et al. |
| 2005/0171955 A1 | 8/2005 | Hull et al. |
| 2005/0177385 A1 | 8/2005 | Hull et al. |
| 2005/0197846 A1 | 9/2005 | Pezaris et al. |
| 2005/0198020 A1 | 9/2005 | Garland et al. |
| 2005/0198031 A1 | 9/2005 | Pezaris et al. |
| 2005/0198305 A1 | 9/2005 | Pezaris et al. |
| 2005/0203807 A1 | 9/2005 | Bezos et al. |
| 2005/0209999 A1 | 9/2005 | Jou |
| 2005/0216300 A1 | 9/2005 | Appelman et al. |
| 2005/0216550 A1 | 9/2005 | Paseman et al. |
| 2005/0235062 A1 | 10/2005 | Lunt et al. |
| 2005/0256756 A1 | 11/2005 | Lam et al. |
| 2006/0004892 A1 | 1/2006 | Lunt et al. |
| 2006/0026147 A1 | 2/2006 | Cone et al. |
| 2006/0041543 A1 | 2/2006 | Achlioptas |
| 2006/0042483 A1 | 3/2006 | Work et al. |
| 2006/0048059 A1 | 3/2006 | Etkin |
| 2006/0052091 A1 | 3/2006 | Onyon et al. |
| 2006/0064431 A1 | 3/2006 | Kishore et al. |
| 2006/0080613 A1 | 4/2006 | Savant |
| 2006/0085419 A1 | 4/2006 | Rosen |
| 2006/0106847 A1 | 5/2006 | Eckardt et al. |
| 2006/0136419 A1 | 6/2006 | Brydon et al. |
| 2006/0143066 A1 | 6/2006 | Calabria |
| 2006/0143183 A1 | 6/2006 | Goldberg et al. |
| 2006/0161599 A1 | 7/2006 | Rosen |
| 2006/0173838 A1 | 8/2006 | Garg et al. |
| 2006/0184617 A1 | 8/2006 | Nicholas et al. |
| 2006/0190281 A1 | 8/2006 | Kott et al. |
| 2006/0194186 A1 | 8/2006 | Nanda |
| 2006/0218225 A1 | 9/2006 | Hee Voon et al. |
| 2006/0229063 A1 | 10/2006 | Koch |
| 2006/0230061 A1 | 10/2006 | Sample et al. |
| 2006/0247940 A1 | 11/2006 | Zhu et al. |
| 2006/0248573 A1 | 11/2006 | Pannu et al. |
| 2006/0251339 A1 | 11/2006 | Gokturk et al. |
| 2006/0256008 A1 | 11/2006 | Rosenberg |
| 2006/0265227 A1 | 11/2006 | Sadamura et al. |
| 2006/0293976 A1 | 12/2006 | Nam |
| 2007/0038594 A1 | 2/2007 | Goodwin et al. |
| 2007/0043688 A1 | 2/2007 | Kountz et al. |
| 2007/0174389 A1 | 7/2007 | Armstrong et al. |
| 2007/0208916 A1 | 9/2007 | Tomita |
| 2007/0282987 A1 | 12/2007 | Fischer et al. |
| 2008/0005076 A1 | 1/2008 | Payne et al. |
| 2008/0010343 A1 | 1/2008 | Escaffi et al. |
| 2008/0033776 A1 | 2/2008 | Marchese |
| 2008/0040428 A1 | 2/2008 | Wei et al. |
| 2008/0070697 A1 | 3/2008 | Robinson et al. |
| 2008/0086458 A1 | 4/2008 | Robinson et al. |
| 2008/0091723 A1 | 4/2008 | Zuckerberg et al. |
| 2008/0281622 A1 | 11/2008 | Hoal |
| 2009/0049127 A1 | 2/2009 | Juan et al. |
| 2009/0055435 A1 | 2/2009 | Kiviluoto et al. |
| 2011/0185020 A1 | 7/2011 | Ramamurthy et al. |
| 2012/0036127 A1 | 2/2012 | Work et al. |
| 2013/0254192 A1 | 9/2013 | Work et al. |
| 2013/0290448 A1 | 10/2013 | Work et al. |
| 2013/0297589 A1 | 11/2013 | Work et al. |

OTHER PUBLICATIONS

Flores, F. et al., "Computer systems and the design of organizational interaction." In ACM Transactions on Information Systems (TOIS), vol. 6, Issue 2, Apr. 1988.

Hofmann, T. 'Collaborative Filtering via Gaussian Probabilistic Latent Semantic Analysis', SIGIR '03, Proceedings of 26th annual International ACM SIGIR conference on Research and development in information retrieval, Jul. 28-Aug. 1, 2003, pp. 259-266 [online]. Association of Computer Machinery [retrieved on Nov. 15, 2010]doi>10.1145/860435.860483.

Parzek, E. Social Networking to Chipin to a Good Cause [online]. Business Design Studio, Jun. 29, 2006 http://www.businessdesignstudio.com/resources/blogger/2006/06social-networking-tochipin-to-good.html.

PCT International Search Report and Written Opinion, PCT/US2008/008221, Oct. 1, 2008, 8 Pages.

U.S. Appl. No. 11/493,291, filed Jul. 25, 2006, Mark Zuckerberg, Systems and Methods for Dynamically Generating a Privacy Summary.

U.S. Appl. No. 11/499,093, filed Aug. 2, 2006, Mark Zuckerberg, Systems and Methods for Dynamically Generating Segmented Community Flyers.

U.S. Appl. No. 11/502,757, filed Aug. 11, 2006, Andrew Bosworth, Systems and Methods for Generating Dynamic Relationship-Based Content Personalized for Members of a Web-Based Social Network.

U.S. Appl. No. 11/503,037, filed Aug. 11, 2006, Mark Zuckerberg, Systems and Methods for Providing Dynamically Selected Media Content to a User of an Electronic Device in a Social Network Environment.

U.S. Appl. No. 11/503,093, filed Aug. 11, 2006, Andrew Bosworth, Systems and Methods for Measuring User Affinity in a Social Network Environment.

U.S. Appl. No. 11/503,242, filed Aug. 11, 2006, Mark Zuckerberg, System and Method for Dynamically Providing a News Feed About a User of a Social Network.

U.S. Appl. No. 11/580,210, filed Oct. 11, 2006, Mark Zuckerberg, System and Method for Tagging Digital Media.

U.S. Appl. No. 11/639,655, filed Dec. 14, 2006, Mark Zuckerberg, Systems and Methods for Social Mapping.

U.S. Appl. No. 11/646,206, filed Dec. 26, 2006, Aaron Sittig, Systems and Methods for Generating a Social Timeline.

U.S. Appl. No. 11/701,566, filed Feb. 2, 2007, Jed Stremel, System and Method for Automatic Population of a Contact File with Contact Content and Expression Content.

U.S. Appl. No. 11/701,595, filed Feb. 2, 2007, Ezra Callahan, System and Method for Determining a Trust Level in a Social Network Environment.

U.S. Appl. No. 11/701,698, filed Feb. 2, 2007, Jed Stremel, System and Method for Digital File Distribution.

U.S. Appl. No. 11/701,744, filed Feb. 2, 2007, Andrew Bosworth, System and Method for Curtailing Objectionable Behavior in a Web-Based Social Network.

(56) References Cited

OTHER PUBLICATIONS

U.S. Appl. No. 11/713,455, filed Feb. 28, 2007, Jed Stremel, Systems and Methods for Automatically Locating Web-Based Social Network Members.
U.S. Appl. No. 11/726,962, filed Mar. 23, 2007, Charlie Cheever, System and Method for Confirming an Association in a Web-Based Social Network.
U.S. Appl. No. 11/796,184, filed Apr. 27, 2007, Jared S. Morgenstern, System and Method for Giving Gifts and Displaying Assets in a Social Network Environment.
U.S. Appl. No. 11/893,493, filed Aug. 15, 2007, Arieh Steinberg, Web-Based Social Network Badges.
U.S. Appl. No. 11/893,559, filed Aug. 15, 2007, Adam D'Angelo, Platform for Providing a Social Context to Software Applications.
U.S. Appl. No. 11/893,797, filed Aug. 16, 2007, Yun-Fang Juan, System and Method for Invitation Targeting in a Web-Based Social Network.
U.S. Appl. No. 11/899,426, filed Sep. 5, 2007, Jared Morgenstern, System and Method for Collectively Giving Gifts in a Social Network Environment.
U.S. Appl. No. 11/982,974, filed Nov. 5, 2007, Ruchi Sanghvi, Systems and Methods for a Web-Based Social Networking Environment Integrated Within One or More Computing and/or Networking Applications.
U.S. Appl. No. 12/072,003, filed Feb. 21, 2008, Arieh Steinberg, Systems and Methods for Implementation of a Structured Query Language Interface in a Distributed Database Environment.
U.S. Appl. No. 12/077,070, filed Mar. 13, 2008, Dave Fetterman, Systems and Methods for Network Authentication.
U.S. Appl. No. 12/080,808, filed Apr. 2, 2008, Peter Deng, Systems and Methods for Calendaring.
U.S. Appl. No. 12/151,734, filed May 7, 2008, Jared Morgenstern, Systems and Methods for Classified Advertising in an Authenticated Web-Based Social Network.
U.S. Appl. No. 12/154,886, filed May 27, 2008, Nico Vera, Systems and Methods for Providing Privacy Settings for Applications Associated with a User Profile.
U.S. Appl. No. 12/154,504, filed May 23, 2008, Adam D'Angelo, Personalized Platform for Accessing Internet Applications.
U.S. Appl. No. 12/156,091, filed May 28, 2008, Mark Zuckerberg, Systems and Methods for Auction Based Polling.
U.S. Appl. No. 60/965,624, filed Aug. 20, 2007, Adam D'Angelo, Systems and Methods for Targeting Advertisements in a Social Network Environment.
U.S. Appl. No. 60/965,852, filed Aug. 22, 2007, Adam D'Angelo, Systems and Methods for Advertising.
U.S. Appl. No. 60/966,442, filed Aug. 28, 2007, Ezra Callahan, System and Method for Incorporating an Entity or Group other than a Natural Person into a Social Network.
U.S. Appl. No. 60/967,842, filed Sep. 7, 2007, Ezra Callahan, Systems and Methods for Dynamically Updating Privacy Settings.
U.S. Appl. No. 61/005,614, filed Dec. 5, 2007, Yishan Wong, Systems and Methods for Community Translations on a Web-Based Social Network.
United States Office Action, U.S. Appl. No. 13/428,765, Aug. 20, 2015, six pages.
United States Office Action, U.S. Appl. No. 13/214,211, Dec. 2, 2011, nine pages.
United States Office Action, U.S. Appl. No. 11/893,820, Nov. 29, 2010, 18 pages.

PREDICTION OF USER RESPONSE TO INVITATIONS IN A SOCIAL NETWORKING SYSTEM BASED ON KEYWORDS IN THE USER'S PROFILE

CROSS REFERENCE TO RELATED APPLICATIONS

This application is a continuation of U.S. application Ser. No. 13/428,765, filed Mar. 23, 2012, which is a continuation of U.S. application Ser. No. 13/214,211, filed Aug. 21, 2011, which is a continuation of U.S. application Ser. No. 11/893,820, filed Aug. 16, 2007, each of which is incorporated by reference in their entirety.

This application also incorporates by reference the following: U.S. patent application Ser. No. 11/639,655 filed on Dec. 14, 2006, entitled "Systems and Methods for Social Mapping," which in turn claims the benefit and priority of U.S. Provisional Patent Application Ser. No. 60/750,844 filed on Dec. 14, 2005, entitled "Systems and Methods for Social Mapping"; U.S. Pat. No. 7,797,256, filed on Aug. 2, 2006, entitled "Systems and Methods for Dynamically Generating Segmented Community Flyers"; U.S. Pat. No. 7,669,123, filed on Aug. 11, 2006, entitled "System and Method for Dynamically Providing a News Feed About a User of a Social Network"; U.S. patent application Ser. No. 11/580,210 filed on Oct. 11, 2006, entitled "System and Method for Tagging Digital Media"; U.S. patent application Ser. No. 11/796,184 filed on Apr. 27, 2007, entitled "Systems and Methods for Giving Gifts and Displaying Assets in a Social Network Environment," which in turn claims the benefit and priority of U.S. Provisional Patent Application Ser. No. 60/899,121 filed on Feb. 2, 2007, entitled "Systems and Methods for Automatically Giving Gifts and Displaying Assets in a Social Network Environment"; and U.S. patent application Ser. No. 11/893,797 filed on Aug. 16, 2007, entitled "System and Method for Invitation Targeting in a Web-Based Social Network."

BACKGROUND

This invention relates generally to social networks, and more particularly to invitations in a social network.

Social network environments present many types of invitations to users. Examples of an invitation include an advertisement, a request to join a group, a request for an information exchange, a survey, a request to write a blog entry, a request to verify a photo tag, and so forth.

It is often useful to be able to characterize major differences between two sets of users in a social network. A probability function may be useful for predicting the likelihood of a positive or negative response by a user to an invitation. In a co-pending application, the probability function may be determined from user information including keywords in selected user profiles and from the users' responses to a prior invitation. See U.S. patent application Ser. No. 11/893,797 filed on Aug. 16, 2007, entitled "System and Method for Invitation Targeting in a Web-Based Social Network." However, those techniques do not allow for a determination of characteristics of the users who respond and/or do not respond to the invitation (e.g., what distinguishes the users who respond from the users who do not respond, how do the users who responded differ demographically from users in general and from users who do not respond, etc.). For example, the number of users who respond may not be sufficient to provide useful information or make statistically significant inferences. The raw information about the keywords used in determining the probability function may be insufficient to provide useful details about a correlation between user information and the users. Moreover, data manipulation used in determining the probability function may reduce the user information including the keywords to a format that is not easily interpreted and make it difficult to extract insights directly from the keywords or the probability function results.

SUMMARY

In one embodiment, the present invention provides a method of using responses to an invitation for selecting keywords that are useful in determining characteristics of a user. The method includes selecting two groups of users and calculating a histogram of the keywords for each group. The histograms are compared and the keywords ranked from high to low based on the comparison. A predetermined number of the highest ranked keywords may be selected. Various criteria may be used for selecting either of the two groups. For example, the two groups may be selected from users who respond to an invitation and users who do not respond to the invitation, respectively. Alternatively, the two groups may be selected from users who are likely to respond to the invitation and a random selection of users, respectively. In some embodiments, the comparison of the histograms for the two groups may be based on an arithmetic difference between corresponding entries in the two groups for each keyword. Alternatively, the comparison may be based on a ratio difference, an information gain, an odds ratio, a relevancy score, and so forth.

In another embodiment, the invention provides a method for selecting a subset of keywords from a set of master keywords in user profiles of social network users. The method comprises computing a first histogram of each keyword in the set of master keywords based on the occurrence of the keywords in a first group of user profiles, computing a second histogram of each keyword in the set of master keywords based on the occurrence of the keywords in a second group of user profiles, computing a score based on a comparison of the first histogram and the second histogram for each keyword in the set of master keywords, ranking the master keywords based on the scores of the keywords, and selecting a subset of keywords from the master keywords based on the ranking.

DETAILED DESCRIPTION

The present invention provides a method for keyword selection in a web-based social network. In one embodiment, a first group and second group of users are selected. The number of occurrences of each keyword in the profiles of the users in the first group may be calculated to produce a first histogram. Likewise, a second histogram may be calculated for the second group. The first histogram may be compared to the second histogram by calculating a score for each keyword based on a difference between the number of occurrences of the keyword in the first group and the number of occurrences of the same keyword in the second group. The keywords may be ranked according to the difference calculated for each keyword, and a set of the highest ranked keywords selected. Alternatively, the comparison of the first histogram to the second histogram may be based on functions other than a difference.

Figure 1:
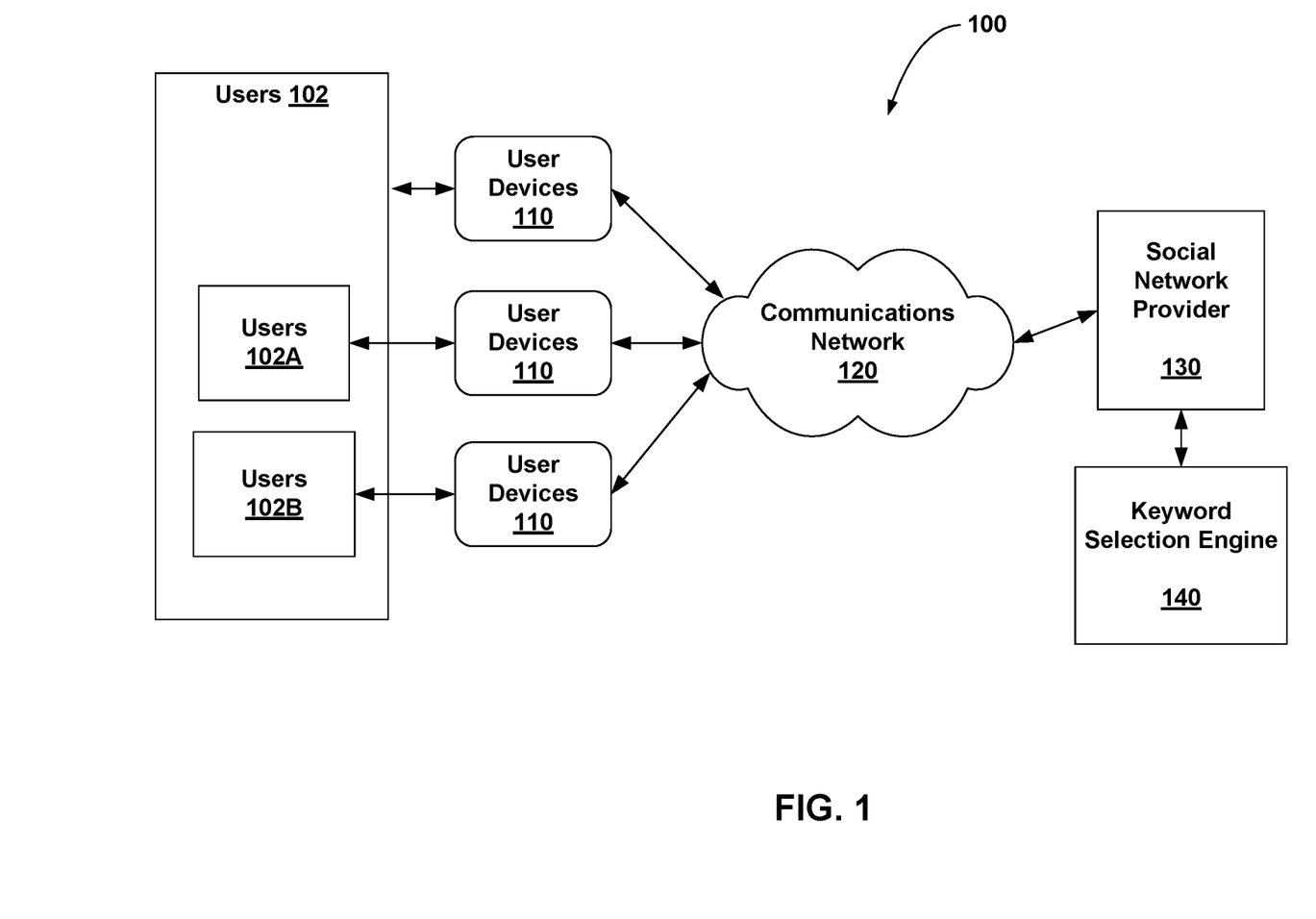
FIG. 1 illustrates an exemplary web based social network environment that may be used with various embodiments of the invention.

FIG. 1 illustrates an exemplary web based social network environment 100 that may be used with various embodiments of the invention. One or more users 102 at user devices 110 are coupled to a social network provider 130 via a communications network 120. The users 102 may include various types of users, including a first group of users 102A who are selected to be members of the first group and a second group of users 102B who are selected to be members of a second group. In various embodiments, user devices 110 may include a computer terminal, a personal digital assistant (PDA), a wireless telephone, a digital camera, a mobile device, a mobile phone, a cell-phone, a smart-phone, a notebook computer, a laptop computer, a hand-held game console, and so forth. In various embodiments, the communications network 120 may include a local area network (LAN) such as an intranet, a wide area network (WAN) such as the Internet, a wireless network, etc.

The social network provider 130 is an entity or person that provides social networking services, communication services, dating services, company intranets, and/or online games, etc. The social network provider 130 may assemble and store profiles of the users 102 for use in providing the social networking services. In some embodiments, the social network environment 100 includes a segmented community, such as a separate, exclusive or semi-exclusive subset of the social network environment 100, wherein users 102 who are segmented community members may access and interact with other members of their respective segmented community. The social network environment 100 further includes a keyword extraction engine 140 coupled to the social network provider 130.

Figure 2:
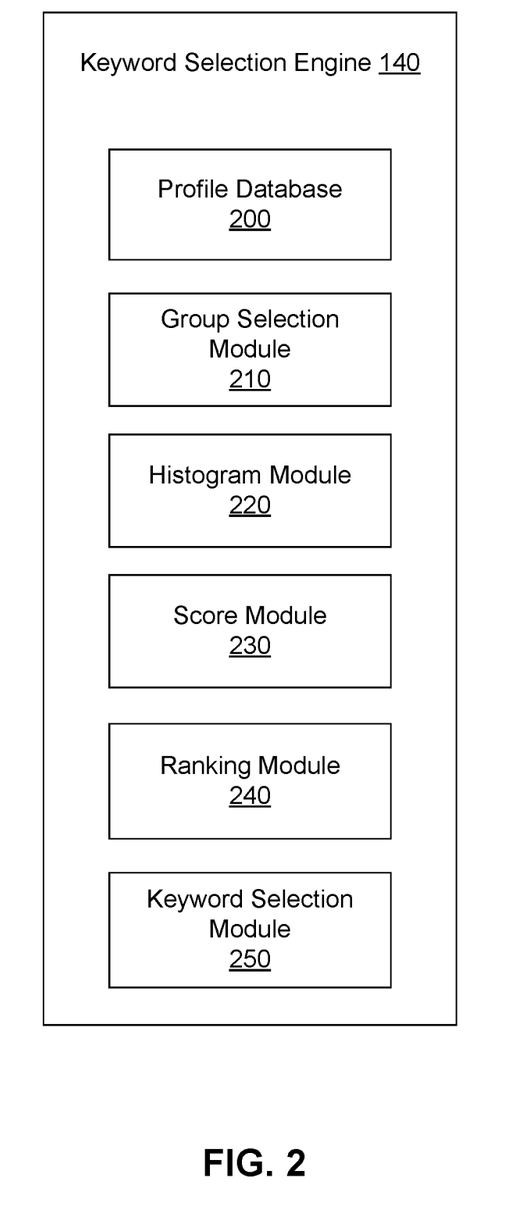
FIG. 2 illustrates one embodiment of the architecture of the keyword extraction engine of FIG. 1.

FIG. 2 illustrates one embodiment of the architecture of the keyword extraction engine 140 of FIG. 1. The keyword extraction engine 140 is configured to select keywords that are useful in characterizing the users 102. The keyword extraction engine 140 includes a profile database 200, a group selection module 210, a histogram module 220, a score module 230, an optional ranking module 240, and a keyword selection module 250.

The profile database 200 manages profile information that is provided by users 102 of the social network. The profile information may contain keywords. Keywords may be words or phrases relating to information about the users 102. Keywords include words relating to demographics, interests, usage, actions, or other information that may describe each of the users 102. Keywords may be entered by the user, may be entered about the user 102, or may be inferred from other information about the user 102. A user profile may include multiple occurrences of one or more keywords. The profile information for the users 102 may be found in more than one database available to the social network provider 130, for example, the social network provider 130 and/or the keyword extraction engine 140.

The profile database 200 may store values including numerical values, binary values, and/or categorical values to represent various types of keywords. A numerical value may represent an age, a phone number, or other data normally expressed in numbers. A binary number may represent occurrence or non-occurrence of a keyword in the profile of a user 102. For example, if the keyword is football, a "1" means that the keyword "football" occurs at least once in the profile of the user 102 and a "0" means that "football" does not occur in the profile of the user 102. In some embodiments, a "1" may mean that a keyword (e.g., "football") occurs more than a predetermined number of times. A categorical value may represent a selection from a list. For example, political views may be categorized as 1=liberal, 2=conservative, 3=independent, etc.

Demographic keywords may include information regarding age, gender, relationship status, home state, and school. Demographic keywords may be represented by numerical values, binary values, and/or categorical values. Keywords relating to interests include book titles, authors, movies, television programs, and music. In the illustrated embodiment, keywords relating to interests are represented by binary values. Examples of keywords relating to usage include information regarding friendships, blog posts, online gifts given and received via the social network provider 130, online purchases via the social network provider 130, photo uploads and downloads, photo tags, and photo tag confirmations, and may be represented by numerical values, binary values, and/or categorical values.

Table 1 illustrates various types of keywords that may be stored in the profile database 200. For example, the keyword "Birth Year" in the Keyword Names column of Table 1 is a Demographic keyword and may be represented by a numerical value. The keyword, "Political Views" is also a demographic keyword but may be represented by a categorical value (e.g., 1=liberal, 2=conservative, 3=independent, etc.). The entry "Top 5000 Favorite Movies" in the Keyword Names column represents 5000 different keywords each associated with a different one of 5000 of the most popular movie titles in the profile database, respectively. For example, the movie title "Gone With The Wind" may be a keyword. Each of the 5000 keywords is an Interest keyword and is represented by a binary value in the illustrated embodiment to indicate that the movie title occurs or does not occur in the profile of a user 102. While Demographic and Interest keyword types are illustrated in Table 1, other keyword types (e.g., contacts, skills, etc.) may also be included.

TABLE 1

| Keywords | | |
| --- | --- | --- |
| Keyword Names | Keyword Type | Value |
| Gender | Demographic | Categorical |
| Birth Year | Demographic | Numerical |
| Political Views | Demographic | Categorical |
| Relationship Status | Demographic | Categorical |
| User Type | Demographic | Categorical |
| Top 5000 Favorite Movies | Interests | 5000 Binary |
| Top 5000 Favorite Books | Interests | 5000 Binary |
| Top 5000 Favorite Music | Interests | 5000 Binary |
| Top 5000 Favorite Activities | Interests | 5000 Binary |
| Top 5000 Favorite TV shows | Interests | 5000 Binary |

The group selection module 210 is configured to select a first group of users 102A and a second group of users 102B. The group selection module 210 may use various criteria for selecting users 102 for the first group and/or the second group. For example, an invitation may be sent to a number of users 102, and the group selection module 210 may select the users 102A from users 102 who respond positively to the invitation for the first group and the users 102B from users 102 who respond negatively to the invitation for the second group. Alternatively, the first or second group may include a random selection of all users 102.

In some embodiments, the group selection module 210 is configured to use a probability function to select the first group of users 102A and/or the second group of users 102B. The probability function may be used to calculate a probability that a user 102 will respond to an invitation. The group selection module 210 may select the users 102A from users 102 for whom the calculated probability of a positive response is greater than (or less than) a threshold. The second group may include a random selection of all users 102. Alternatively, the second group may be selected from users 102 for whom the calculated probability of a positive response is less than (or greater than) the threshold for inclusion in the first group, or another threshold. The threshold may be selected to provide a desired number of users 102A and/or 102B.

The methods of selecting two groups of users are not limited to using the various combinations of probability calculations, random selection, and/or user responses discussed above. Other methods of selecting pairs of groups may be used. For example, selection of pairs of groups may be based on activities initiated by the users 102, activities directed at the users 102 by others, inferred characteristics of the users 102, capabilities of the users 102, skill levels of the users 102, etc. More information about group selection and keyword selection is contained in a paper entitled "Personalization for Online Social Networks" by Yun-Fang Juan, et al., presently unpublished and attached hereto as an appendix.

The histogram module 220 is configured to calculate a first histogram for the first group and a second histogram for the second group. For each of the keywords, the histogram module 220 determines the number of profiles in which the keyword occurs in the first group and number of profiles in which the keyword occurs in the second group. The histogram module 220 may store the number as a percentage of the total number of profiles in the first group and the second group, respectively.

Table 2 includes "Keyword," "First Group," "Second Group," and "Score" columns. Table 2 is sorted according to values in the "Score" column, which is discussed below. The "First Group" column in Table 2 represents the first histogram and the "Second Group" column represents the second histogram. Each of the keywords in the "Keyword" column is associated with a percentage in the "First Group" column and another percentage in the "Second Group" column. For example, the keyword "red hot chili peppers" is associated 6 percent in the "First Group" column and 0.9 percent in the "Second Group" column. Thus, the keyword "red hot chili peppers" occurs in 6 percent of the profiles of the users 102A in the first group and in 0.9 percent of the profiles of the users 102B in the second group.

Values other than percentages may be represented in the first and second histograms, for example, frequency of occurrences, total number of occurrences, probability of occurrence, etc. To avoid storing useless information, the histogram module 220 may omit a keyword, for example, when the keyword occurs in substantially all of the profiles or none of the profiles. While Table 2 illustrates 20 keywords, fewer or more keywords may be included in the first and the second histograms. Some of the keywords illustrated in Table 2 are demographic type keywords. For example, "politics (liberal)," "age range (20-25)," and "age range (50-55)." In some embodiments, a numerical value may be used to calculate a histogram entry. For example, an age entry for the first and the second histograms may be based on an average age, maximum age, minimum age, mean age, etc. of the users 102A in the first group and users 102B in the second group, respectively.

TABLE 2

Keyword Histogram

| Keyword | First Group | Second Group | Score |
|---|---|---|---|
| 24 (tv show) | 15.0 | 0.2 | 14.8 |
| sportscenter | 12.0 | 1.0 | 11.0 |
| wedding crashers | 8.0 | 0.8 | 7.2 |
| age range (20-25) | 11.0 | 5.0 | 6.0 |
| friday night lights | 6.0 | 0.8 | 5.2 |
| red hot chili peppers | 6.0 | 0.9 | 5.1 |
| seinfeld | 6.0 | 2.0 | 4.0 |
| remember titans | 13.0 | 12.0 | 1.0 |
| baseball | 5.0 | 4.0 | 1.0 |
| girls | 2.0 | 1.0 | 1.0 |
| lost | 0.9 | 0.5 | 0.4 |
| family guy | 0.3 | 0.1 | 0.2 |
| south park | 0.3 | 0.1 | 0.2 |
| basketball | 0.6 | 0.4 | 0.2 |
| politics (liberal) | 0.1 | 0.0 | 0.1 |
| gladiator | 0.3 | 0.2 | 0.1 |
| foo fighters | 0.5 | 0.4 | 0.1 |
| happy gilmore | 0.1 | 0.1 | 0.0 |
| sports | 0.1 | 0.1 | 0.0 |
| age range (50-55) | 0.0 | 0.0 | 0.0 |

The score module 230 is configured to calculate a score for each keyword based on a function $F(A_j, B_j)$ where, $A_j$ is a value representing the $j^{th}$ keyword in the "First Group" column (first histogram) and $B_j$ is a value representing $j^{th}$ keyword in the "Second Group" column (second histogram). An example of the function $F(A_j, B_j)$ includes a difference between $A_j$ and $B_j$. The Score column in Table 2 illustrates values representing an arithmetic difference $(A_j-B_j)$ for each keyword. For example, the score for the keyword "red hot chili peppers" is 5.1, which is equal to 6 percent in the "First Group" column minus 0.9 percent in the "Second Group" column. In various embodiments, the score function $F(A_j, B_j)$ includes an arithmetic difference, a ratio difference, an information gain, an odds ratio, a relevancy score, and so forth, as illustrated in Table 3.

TABLE 3

Examples of Score Functions $F(A_j, B_j)$

| Score Function Type | Function $F(A_j, B_j)$ |
|---|---|
| Arithmetic Difference | $(A_j - B_j)$ |
| Ratio Difference | $(A_j/B_j)$ |
| Information Gain | $H(A_j) - H(B_j)$ |
| | $H(p)$ denotes entropy of p where: |
| | $H(p) = p \log_2\left(\frac{1}{p}\right) + (1-p)\log_2\left(\frac{1}{1-p}\right)$ and |
| | $p = \left(\frac{\text{positive examples}}{\text{total number of examples}}\right)$ |
| Odds Ratio | $(A_j(1 - B_j))/((1 - A_j)B_j)$ |
| Relevancy Score | $((A_j + D)/(B_j + D))$ |
| | D is the Laplace succession parameter |

The ranking module 240 is configured to arrange the histogram according to the scores of each keyword. The histogram may be ranked from highest score to lowest score, as illustrated in Table 2. For example, the keyword "red hot chili peppers" is ranked fifth in the histogram illustrated in Table 2. Alternatively, the histogram may be ranked from lowest score to highest score The keyword selection module 250 may select a predetermined number of keywords from the ranked histogram. For example, keywords having the highest six scores (i.e., "24," "sportscenter," "wedding crashers," "old," "friday night lights," and "red hot chili peppers") may be selected from the histogram in Table 2. Alternatively, the keyword selection module 250 may select keywords having a score greater than a threshold value, before or after the ranking module 240 arranges the histogram according to score. For example, the three keywords "24," "sportscenter," and "wedding crashers" may be selected based on having a score greater than 7.0. In various embodiments, the keyword selection module 250 may select keywords based on other criteria, for example, a predetermined number of the keywords having the lowest scores, keywords having scores lower than a threshold value, and so on.

Although the keyword extraction engine 140 is described as being comprised of various components (i.e., the profile database 200, the group selection module 210, the histogram module 220, the score module 230, the ranking module 240, and the keyword selection module 250), fewer or more components may comprise the keyword extraction engine 140 and still fall within the scope of various embodiments.

Figure 3:
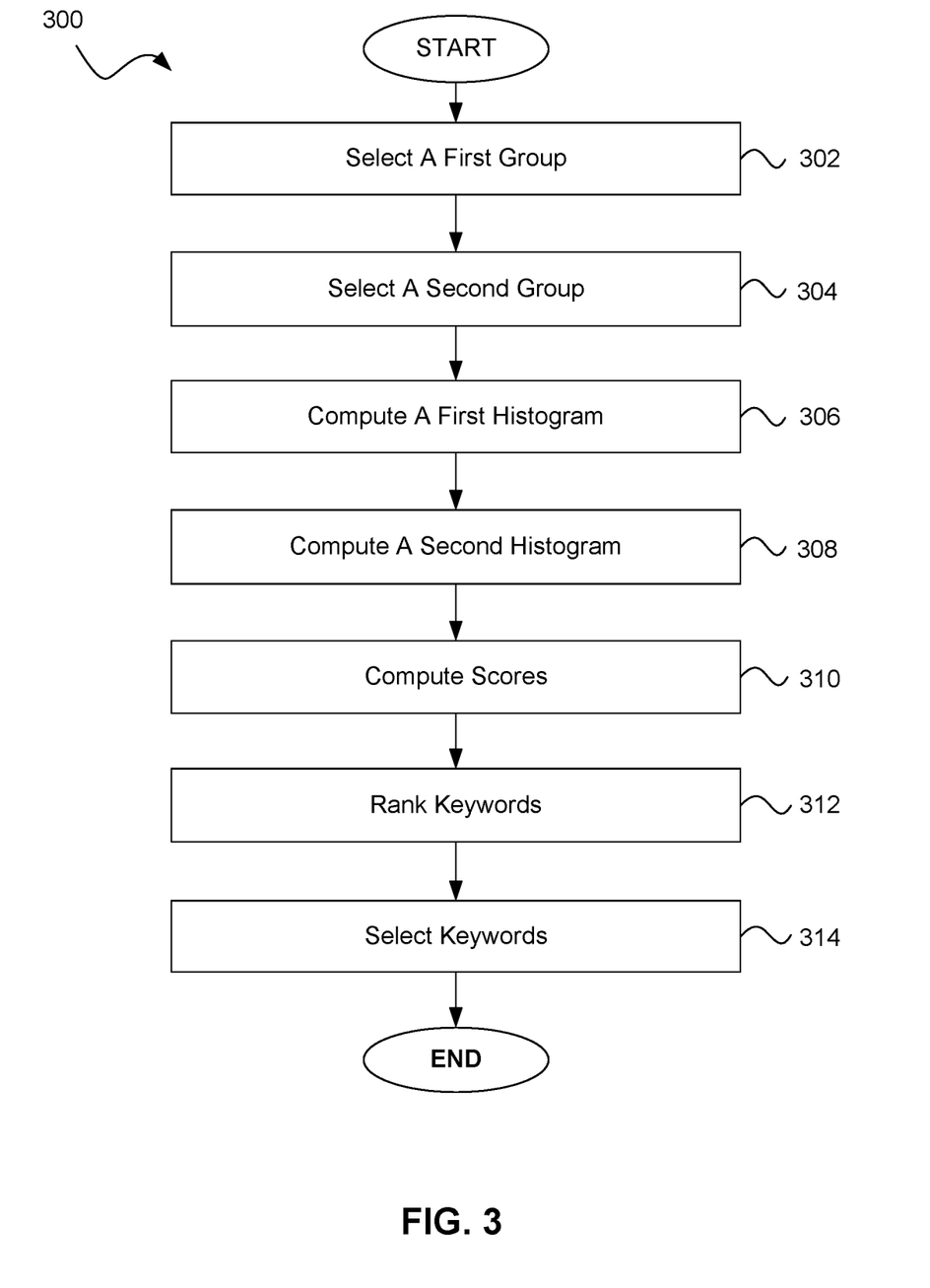
FIG. 3 is a flow chart of an exemplary method for selecting target users of a web-based social network environment.

FIG. 3 is a flow chart of an exemplary method 300 for selecting a subset of keywords from a set of master keywords in a social network environment 100. In step 302, a first group of user profiles is selected and in step 304, a second group of user profiles is selected. In step 306, a first histogram is computed for each keyword in the master keywords based on a number of occurrences of the keyword in the first group of user profiles. In step 308, a second histogram is computed for each keyword in the master keywords based on a number of occurrences of the keyword in the second group of user profiles. The histograms computed in steps 306 and 308 may include the percentage or the number of occurrences of each of the keywords in the first and second groups, respectively. In step 310, a score is computed based on a comparison of the first histogram and the second histogram for each keyword in the master keywords. In optional step 312, the master keywords are ranked based on the scores, for example, by sorting the scores from highest to lowest. In step 314, a subset of keywords is selected based on the score for each of the master keywords. As above, the one hundred highest scored keywords may be selected from the master keywords based on the ranking. Alternatively, the keywords having a score greater than a predetermined number may be selected.

While the method 300 is described as being comprised of various steps, fewer or more steps may comprise the process and still fall within the scope of various embodiments. The order of the steps in the method 300 may be varied and still fall within the scope the various embodiments. For example, the step 306 of computing a first histogram may be performed after the step 308 of computing the second histogram. In some embodiments, the steps of method 300 may be performed by the keyword extraction engine.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A computer-implemented method comprising:
   extracting a set of keywords from a subject user profile of a subject user of an online system;
   determining a first number of occurrences of keywords from the set of keywords in a first group of user profiles of the online system who positively responded to an invitation;
   determining a second number of occurrences of keywords from the set of keywords in a second group of user profiles of the online system who negatively responded to the invitation;
   determining a score for one or more of the keywords from the set of keywords based on a comparison of the first number of occurrences and the second number of occurrences; and
   predicting a response to the invitation by the subject user based on the score for one or more of the keywords.

2. The method of claim 1, wherein the invitation comprises a request to perform an action, the action selected from a group consisting of: joining a group, exchanging information, responding to a survey, writing a blog entry and verifying a photo tag.

3. The method of claim 1, wherein the set of keywords includes at least one of words associated with to demographic information associated with the subject user, associated with interests declared by the subject user in the subject user profile, or associated with actions performed by the subject user.

4. The method of claim 1, wherein the computed score for the one or more keywords in the set of keywords is based on a function of the first number of occurrences of the keywords and the second number of occurrences of the keywords.

5. The method of claim 4, wherein the function is selected from a group consisting of: an arithmetic difference, a ratio difference, an information gain, an odds ratio, and a relevancy score.

6. The method of claim 5, wherein the function increases as a difference between the first number of occurrences of a keyword in the group of user profiles corresponding to the group of users who responded positively to the invitation relative to the second number of occurrences of the keyword in the group of user profiles corresponding to the group of users who responded positively to the invitation increases.

7. A computer-implemented method comprising:
   obtaining keywords from user profiles of a group of previously responding users of an online system, the previously responding users having previously responded to an invitation;
   extracting a set of keywords from a subject user profile of a subject user of an online system;
   comparing the set of keywords to the keywords from the user profiles of the group of previously responding users; and
   predicting a response to the invitation by the subject user based on the comparison.

8. The method of claim 7, wherein comparing the set of keywords to the keywords from the user profiles of the group of previously responding users comprises:
   determining a first number of occurrences, in a first group of user profiles corresponding to a group of other users who responded positively to the invitation, of keywords from the set of keywords;
   determining a second number of occurrences, in a second group of user profiles corresponding to a group of other users who responded negatively to the invitation, of keywords from the set of the keywords; and computing a score for each of the keywords from the set of keywords based on a comparison of the first number of occurrences of the keywords and the second number of occurrences of the keywords.

9. The method of claim 8, wherein predicting how the subject user will respond to the invitation based on the comparison comprises:

predicting how the user will respond to the invitation based on the score for one or more keywords from the set of keywords.

10. The method of claim 7, wherein the invitation comprises a request to perform an action, the action selected from a group consisting of: joining a group, exchanging information, responding to a survey, writing a blog entry and verifying a photo tag.

11. The method of claim 7, wherein the set of keywords includes at least one of words associated with to demographic information associated with the subject user, associated with interests declared by the subject user in the subject user profile, or associated with actions performed by the subject user.

12. A computer-implemented method comprising:

extracting a set of keywords from a subject user profile of a subject user of an online system;

determining a first occurrence of keywords in the set of keywords in a first group of user profiles who positively responded to an invitation;

determining a second occurrence of keywords in the set of keywords in a second group of user profiles who negatively responded to the invitation;

determining a score for one or more of the keywords in the set of keywords based on a comparison of the first occurrence and the second occurrence; and predicting a response to the invitation by the subject user based on the score for one or more of the keywords.

13. The method of claim 12, wherein the invitation comprises a request to perform an action, the action selected from a group consisting of: joining a group, exchanging information, responding to a survey, writing a blog entry and verifying a photo tag.

14. The method of claim 12, wherein the set of keywords includes words associated with to demographic information associated with the subject user.

15. The method of claim 12, wherein the set of keywords includes words associated with interests declared by the subject user in the subject user profile.

16. The method of claim 12, wherein the set of keywords includes words associated with actions performed by the subject user.

17. The method of claim 12, wherein the invitation comprises an advertisement.

18. The method of claim 12, wherein the score for the one or more keywords in the set of keywords is based on a function of the first number of occurrences of the keywords and the second number of occurrences of the keywords.

19. The method of claim 18, wherein the function increases as a difference between the first occurrence of a keyword in the group of user profiles corresponding to the group of users who responded positively to the invitation relative to the second occurrence of the keyword in the group of user profiles corresponding to the group of users who responded positively to the invitation increases.

20. The method of claim 18, wherein the function is selected from a group consisting of: an arithmetic difference, a ratio difference, an information gain, an odds ratio, and a relevancy score.

* * * * *

UNITED STATES PATENT AND TRADEMARK OFFICE
CERTIFICATE OF CORRECTION

PATENT NO. : 9,727,927 B2
APPLICATION NO. : 15/263224
DATED : August 8, 2017
INVENTOR(S) : Yun-Fang Juan and Kang-Xing Jin Page 1 of 1

It is certified that error appears in the above-identified patent and that said Letters Patent is hereby corrected as shown below:

In the Claims

Column 8, Lines 27-28, Claim 3, delete "at least one of words associated with to demographic information" and insert --at least one of words associated with demographic information--.

Column 9, Lines 19-20, Claim 11, delete "at least one of words associated with to demographic information" insert --at least one of words associated with demographic information--.

Column 10, Line 9, Claim 14, delete "words associated with to demographic information" insert --words associated with demographic information--.

Signed and Sealed this
Nineteenth Day of March, 2019

Andrei Iancu
*Director of the United States Patent and Trademark Office*